United States Patent
Zhu et al.

(10) Patent No.: US 8,767,359 B2
(45) Date of Patent: Jul. 1, 2014

(54) ELECTROSTATIC DISCHARGE PROTECTION CIRCUIT AND ELECTROSTATIC DISCHARGE PROTECTION METHOD

(75) Inventors: Kai Zhu, Beijing (CN); Huijuan Cheng, Beijing (CN); Jie Chen, Beijing (CN); Zhiguang Guo, Beijing (CN); Hongwei Li, Beijing (CN)

(73) Assignee: Semiconductor Manufacturing International (Beijing) Corporation, Beijing (CN)

( * ) Notice: Subject to any disclaimer, the term of this patent is extended or adjusted under 35 U.S.C. 154(b) by 215 days.

(21) Appl. No.: 13/314,797

(22) Filed: Dec. 8, 2011

(65) Prior Publication Data

US 2013/0070376 A1    Mar. 21, 2013

(30) Foreign Application Priority Data

Sep. 21, 2011    (CN) .......................... 2011 1 0281322

(51) Int. Cl.
    *H02H 3/22*    (2006.01)
(52) U.S. Cl.
    USPC ........................... 361/56; 361/111

(58) Field of Classification Search
    USPC .................................................. 361/56, 111
    See application file for complete search history.

(56) References Cited

U.S. PATENT DOCUMENTS

| 7,221,551 | B2 * | 5/2007 | Chen .............................. 361/230 |
| 7,782,580 | B2 * | 8/2010 | Gauthier et al. ................ 361/56 |
| 8,064,175 | B2 * | 11/2011 | Poulton ........................... 361/56 |
| 2008/0297960 | A1 * | 12/2008 | Chen .............................. 361/56 |

* cited by examiner

*Primary Examiner* — Danny Nguyen
(74) *Attorney, Agent, or Firm* — Koppel, Patrick, Heybl & Philpott; Michael J. Ram

(57) ABSTRACT

An ESD protection circuit and method for its use are provided. The circuit comprising: a discharge path formed by first and second NMOS transistors which are sequentially connected between a ground and a power supply; an ESD event detection unit; first and second drive units respectively connected between an output of the ESD event detection unit and a gate of the first transistor and between the output of the ESD event detection unit and a gate of the second transistor. The first and second drive units respectively cause the first and second transistors to be turned on during an ESD event and to be turned off when there is no ESD event.

20 Claims, 4 Drawing Sheets

ELECTROSTATIC DISCHARGE PROTECTION CIRCUIT AND ELECTROSTATIC DISCHARGE PROTECTION METHOD

CROSS-REFERENCE TO RELATED APPLICATIONS

This application claims priority to Chinese Patent Application No. 201110281322.4, filed on Sep. 21, 2011 and entitled "Electrostatic Discharge Protection Circuit and Electrostatic Discharge Protection Method", which is incorporated herein in its entirety by reference.

FIELD OF THE INVENTION

The present invention generally relates to semiconductor integrated circuits (IC), and more specifically, relates to an electrostatic discharge (ESD) protection circuit and an electrostatic discharge protection method in an IC.

DESCRIPTION OF THE RELATED ART

With the continuous shrinkage of the size of semiconductor devices, semiconductor devices have become more susceptible to electrostatic damage. Thus, ESD protection for IC chips has become increasingly important.

FIG. 1 shows a common ESD protection circuit 100 in the prior art. In FIG. 1, an NMOS transistor 110 with a large width-to-length ratio is connected between a power supply ($V_{cc}$) and ground ($V_{ss}$), serving as an electrostatic discharge path for instantly discharging ESD current and clamping circuit voltage in a chip. The resistor 120 and capacitor 130 connected in a series constitute a RC discriminator circuit for detecting the occurrence of an ESD event between the power supply and the ground. The three cascaded inverters 140, 150 and 160 constitute an inverter chain that transforms a voltage at node N1 between the resistor 120 and the capacitor 130 to drive the gate of NMOS transistor 110. When an ESD event occurs (i.e. an ESD pulse appears), the RC discriminator circuit is activated by the high-frequency characteristic of the ESD pulse, because the rise time of the ESD pulse is very short (e.g., about 10 ns). Because the voltage at node N1 is low, and the gate voltage of the transistor 110 is driven to high by the inverter chain, the transistor 110 turns on and the ESD current discharged. During the normal operation of the chip, the RC discriminator circuit is not activated, the voltage at node N1 is high and the gate voltage of the transistor 110 is driven to low by the inverter chain, thus causing the transistor 110 to be turned off. Likewise, when the chip is powered on, the RC discriminator circuit is not activated because the voltage rises slowly, thus causing the transistor 110 to be turned off. In this way, the circuit 100 shown in FIG. 1 can protect the chip from ESD damage.

In practice, during the realization of the circuit of FIG. 1, in order to guarantee the lifetime and safety of the transistor 110, the safe operating voltage $V_{so}$ of the transistor 110 should be larger than or equal to the voltage of the power supply $V_{cc}$ of the chip. Herein, the safe operating voltage $V_{so}$ of a transistor refers to the maximum voltage that the transistor can bear for the long-term stable operation. This is an attribute of the transistor. In other words, when a voltage applied between any two of the gate, the source and the drain of a transistor exceeds the safe operating voltage of the transistor, the transistor would be unable to work stably for a long term. For example, the $V_{so}$ of a transistor as an I/O device can be 1.8V, 3.3V, 5V, and so on. However, if the voltage of the power supply $V_{cc}$ is relatively large (e.g., $V_{cc}$=5V), the transistor 110 that would satisfy the corresponding $V_{so}$ requirements (e.g. a transistor with $V_{so}$=5V) would usually have a worse current performance; that is, the current provided by the channel of the transistor per unit area is relatively small. Therefore, in order to provide enough ESD current, the transistor 110 must have a large size, consequently causing the chip to have a large size, which is not desirable.

SUMMARY OF THE INVENTION

In view of the above, the inventor provides a new technical solution of ESD protection that can save chip area while still providing enough ESD current, so as to address the above problems in the prior art.

According to a first aspect of the invention, there is provided an electrostatic discharge (ESD) protection circuit, comprising: an electrostatic discharge unit comprising a first transistor and a second transistor that are connected in series between a first potential and a second potential to form an electrostatic discharge path, wherein the first potential is lower than the second potential, the first transistor and the second transistor both are NMOS transistors, a source of the first transistor is connected to the first potential, and a drain of the second transistor is connected to the second potential; an ESD event detection unit for detecting an ESD event; a first drive unit connected between an output of the ESD event detection unit and a gate of the first transistor, the first drive unit causing the first transistor to be turned on during the ESD event and causing the first transistor to be turned off when there is no ESD event; and a second drive unit connected between the output of the ESD event detection unit and a gate of the second transistor, the second drive unit causing the second transistor to be turned on during the ESD event and causing the second transistor to be turned off when there is no ESD event.

Optionally, the safe operating voltage of the first transistor and the safe operating voltage of the second transistor are both smaller than the difference between the second potential and the first potential.

Optionally, when the second transistor is turned off, the difference between the second potential and the gate voltage of the second transistor is smaller than or equal to the safe operating voltage of the second transistor.

Optionally, the second drive unit comprises: a voltage-controlled switch unit connected between the second potential and the gate of the second transistor, wherein a control terminal of the voltage-controlled switch unit is connected to the output of the ESD event detection unit, and the voltage-controlled switch unit is turned on during the ESD event and is turned off when there is no ESD event; a first voltage divider component, a first terminal of which is connected to the gate of the second transistor and a second terminal of which is connected to the first potential; and a second voltage divider component, a first terminal of which is connected to the second potential and a second terminal of which is connected to the gate of the second transistor.

Optionally, when there is no ESD event, the first voltage divider component has a first equivalent resistance, the second voltage divider component has a second equivalent resistance, the first equivalent resistance and the second equivalent resistance are selected such that a difference between the second potential and the gate voltage of the second transistor is smaller than or equal to the safe operating voltage of the second transistor when there is no ESD event.

Optionally, the sum of the first equivalent resistance and the second equivalent resistance is larger than 5 MΩ.

Optionally, the first drive unit is a single inverter or an odd number of cascaded inverters.

Optionally, the voltage-controlled switch unit is a PMOS transistor having a gate connected to the output of the ESD event detection unit, a source connected to the second potential and a drain connected to the gate of the second transistor.

Optionally, the first voltage divider component comprises one or more NMOS transistors connected in series, the gate of each of which is connected to the output of the ESD event detection unit.

Optionally, the second voltage divider component comprises a third transistor, wherein the third transistor is a PMOS transistor having a gate connected to the first potential, a source connected to the second potential and a drain connected to the gate of the second transistor.

Optionally, the second voltage divider component further comprises a first resistance unit that is connected between the gate of the third transistor and the first potential.

Optionally, the first resistance unit is a tie-high NMOS transistor.

Optionally, the ESD event detection unit comprises a filter resistor and a filter capacitor connected in series, one terminal of the filter resistor and one terminal of the filter capacitor are interconnected as the output of the ESD event detection unit, and the other terminal of the filter resistor and the other terminal of the filter capacitor are respectively connected to the second potential and the first potential.

Optionally, the ESD protection circuit further comprises: a third drive unit consisting of at least one inverter, wherein an input of the third drive unit is connected to the output of the ESD event detection unit, and an output of the third drive unit is connected to an input of the first drive unit and an input of the second drive unit.

According to a second aspect of the invention, there is provided an electrostatic discharge (ESD) protection method, wherein an electrostatic discharge path is formed by a first transistor and a second transistor that are connected in series between a first potential and a second potential, the first potential is lower than the second potential, the first transistor and the second transistor are both NMOS transistors, a source of the first transistor is connected to the first potential, a drain of the second transistor is connected to the second potential, said method comprising: detecting an ESD event and outputting a control signal; and based on the control signal, causing the first transistor and the second transistor to be turned on during the ESD event, and causing the first transistor and the second transistor to be turned off when there is no ESD event.

Optionally, a safe operating voltage of the first transistor and a safe operating voltage of the second transistor are both smaller than the difference between the second potential and the first potential.

Optionally, the first transistor and the second transistor are controlled separately by different drive circuits.

Optionally, a voltage-controlled switch unit connected between the second potential and the gate of the second transistor is used for controlling ON and OFF state of the second transistor.

Optionally, the ESD protection method further comprises: when there is no ESD event, controlling a gate voltage of the second transistor such that the difference between the second potential and the gate voltage of the second transistor is smaller than or equal to the safe operating voltage of the second transistor.

Optionally, controlling the gate voltage of the second transistor when there is no ESD event comprises: providing a first voltage divider component and a second voltage divider component, wherein a first terminal of the first voltage divider component is connected to the gate of the second transistor, a second terminal of the first voltage divider component is connected to the first potential, a first terminal of the second voltage divider component is connected to the second potential and a second terminal of the second voltage divider component is connected to the gate of the second transistor; and selecting such equivalent resistances of the first voltage divider component and the second voltage divider component when there is no ESD event that the difference between the second potential and the gate voltage of the second transistor is smaller than or equal to the safe operating voltage of the second transistor when there is no ESD event.

Optionally, the sum of the equivalent resistances of the first voltage divider component and the second voltage divider component is larger than 5 MΩ.

Optionally, detecting the ESD event and outputting the control signal comprises: providing a filter resistor and a filter capacitor connected in series, wherein one terminal of the filter resistor and one terminal of the filter capacitor are interconnected as a common terminal, and the other terminal of the filter resistor and the other terminal of the filter capacitor are respectively connected to the second potential and the first potential; and setting a voltage at the common terminal as the control signal.

An advantage of the present invention is that the ESD protection circuit and the ESD protection method according to the present invention can save chip area while still providing enough ESD current.

Further features of the present invention and advantages thereof will become apparent from the following detailed description of exemplary embodiments according to the present invention with reference to the accompanying drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

With reference to the accompanying drawings, the present invention can be more clearly understood based on the following detailed description. In the figures.

DESCRIPTION OF THE EMBODIMENTS

Figure 1:
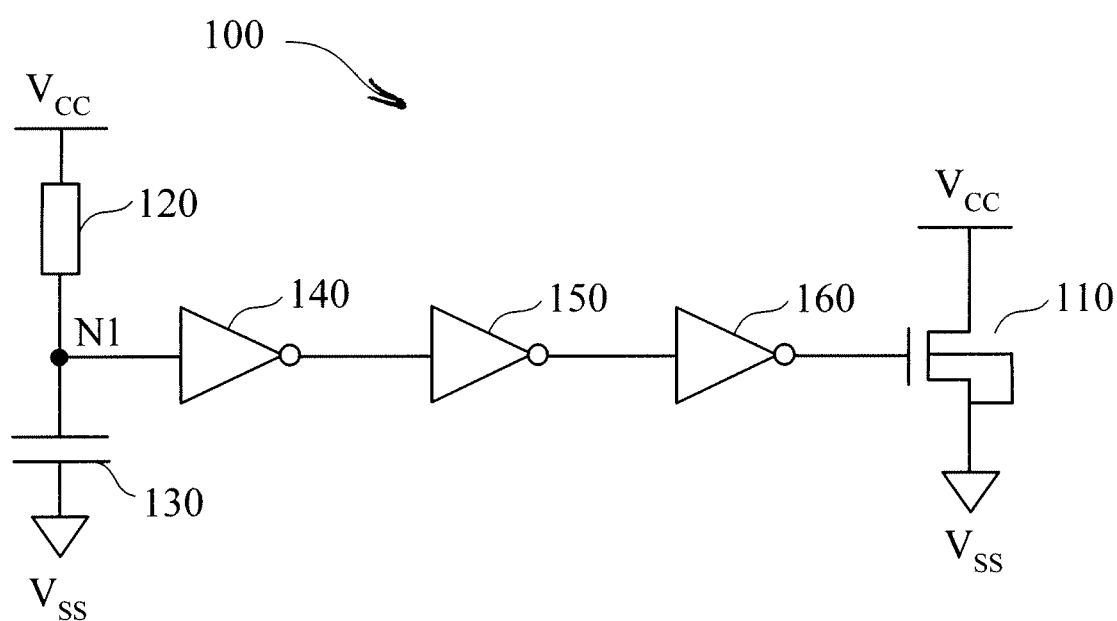
FIG. 1 shows an ESD protection circuit in the prior art.

Various exemplary embodiments of the present invention will now be described in detail with reference to the drawings. It is understood that the relative arrangement of the components and steps, the numerical expressions, and numerical values set forth in these embodiments do not limit the scope of the present invention unless it is specifically stated otherwise.

Meanwhile, it is understood that each component in the figures has not necessarily been drawn to scale.

The following description of at least one exemplary embodiment is merely illustrative in nature and is in no way intended to limit the invention, its application, or its uses.

Techniques, methods and apparatus known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

It is understood that similar reference numerals and letters refer to similar items in the following figures, and thus once an item is defined in one figure, it is possible that it need not be further discussed for following figures.

Figure 2:
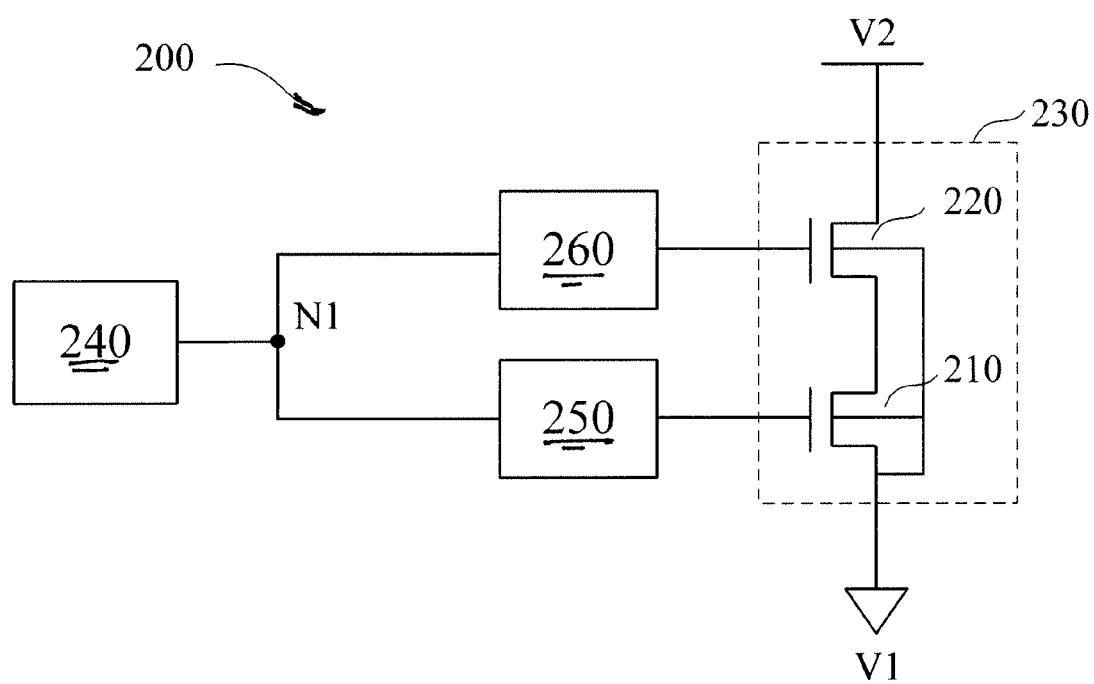
FIG. 2 is a schematic block diagram of an ESD protection circuit according to an embodiment of the present invention.

FIG. 2 is a schematic block diagram showing an ESD protection circuit 200 according to an embodiment of the present invention.

The ESD protection circuit 200 may comprise an electrostatic discharge unit 230, an ESD event detection unit 240, a first drive unit 250 and a second drive unit 260.

The electrostatic discharge unit 230 may comprise a first transistor 210 and a second transistor 220, which are preferably both NMOS transistors. The first transistor 210 and the second transistor 220 are connected in series between a first potential V1 and a second potential V2 to form an electrostatic discharge path. Specifically, a source of the first transistor 210 is connected to V1, a drain of the first transistor 210 is connected to a source of the second transistor 220, and a drain of the second transistor 220 is connected to V2. The first potential V1 and the second potential V2 supply power to a chip, wherein V1 is lower than V2. Preferably, the first potential V1 is ground ($V_{ss}$) and the second potential V2 is power supply voltage ($V_{cc}$). However, V1 and V2 may be any other suitable voltages.

The ESD event detection unit 240 is used for detecting the occurrence of an ESD event so as to output a corresponding signal to the first drive unit 250 and the second drive unit 260. Specifically, the ESD detection unit 240 can output different voltages when an ESD event occurs and when there is no ESD event, respectively. The ESD event detection unit 240 can be implemented in the form of the RC discriminator circuit as shown in FIG. 1, or in any other suitable form. For example, the ESD event detection unit 240 can be a voltage divider that comprises two resistors connected in series, and a voltage output from a common terminal of the two resistors depends on a difference between V1 and V2. Since the voltage of the ESD pulse is higher than the power supply voltage of the chip during the chip's normal operation, by appropriately selecting resistance values of the two resistors, it is possible to make the common terminal output different voltages when an ESD event occurs and when there is no ESD event, so as to control ON and OFF located between and of transistors 210 and 220.

The first drive unit 250 is connected to the output of the ESD event detection unit 240 and the gate of the first transistor 210, for controlling ON and OFF state of the first transistor 210 based on signal output from the ESD event detection unit 240. The first drive unit 250 causes the first transistor 210 to be turned on during an ESD event and causes the first transistor 210 to be turned off when there is no ESD event. Preferably, the first drive unit 250 can be a single inverter or a plurality of cascaded inverters.

The second drive unit 260 is connected between the output of the ESD event detection unit 240 and the gate of the second transistor 220, for controlling ON and OFF state of the second transistor 220 based on signal output from the ESD event detection unit 240. The second drive unit 260 causes the second transistor 220 to be turned on during an ESD event and causes the second transistor 220 to be turned off when there is no ESD event.

Optionally, after the ESD event detection unit 240, there can be a third drive unit (not shown) for processing (such as amplifying, inverting, or the like) signal output from the ESD event detection unit 240, such that these signals become more suitable for being input to the first drive unit 250 and the second drive unit 260.

As previously mentioned in the background, the ESD protection circuit of FIG. 1 may cause the transistor 101 to have an excessively large size when $V_{cc}$ is large, which is not desirable. In contrast, the ESD protection circuit of FIG. 2 employs two NMOS transistors which are connected in series to form an electrostatic discharge path. Each of NMOS transistors 210 and 220 bears a relatively small voltage and thus can be implemented by a transistor having a lower safe operating voltage $V_{so}$. More specifically, the safe operating voltage $V_{so}$ of the first transistor 210 and the safe operating voltage $V_{so}$ of the second transistor 220 can both be smaller than the difference between the second potential V2 and the first potential V1. For example, when $V_{cc}$=5V and $V_{ss}$=0, two transistors each having $V_{so}$=3.3V can be connected in series between $V_{cc}$ and $V_{ss}$ to form a discharge path. These kind of transistors can usually have a relatively thin gate oxide layer. Thus, although these transistors have a lower safe operating voltage, they generally have a better current performance. In other words, the transistors 210 and 220 require much smaller area to provide enough ESD current, thereby significantly saving chip area.

Further, in the ESD protection circuit of FIG. 2, the second drive unit 260 can be preferably configured such that a difference between the second potential V2 and the gate voltage of the second transistor 220 is smaller than or equal to the safe operating voltage of the second transistor 220 when the second transistor 220 is in an OFF state. That is, a voltage difference between the drain and the gate of the second transistor 220 is set to be smaller than or equal to the safe operating voltage thereof, thereby ensuring the long-term stable operation of the second transistor 220. The second drive unit 260 achieves this objective by controlling the voltage it outputs.

Figure 3:
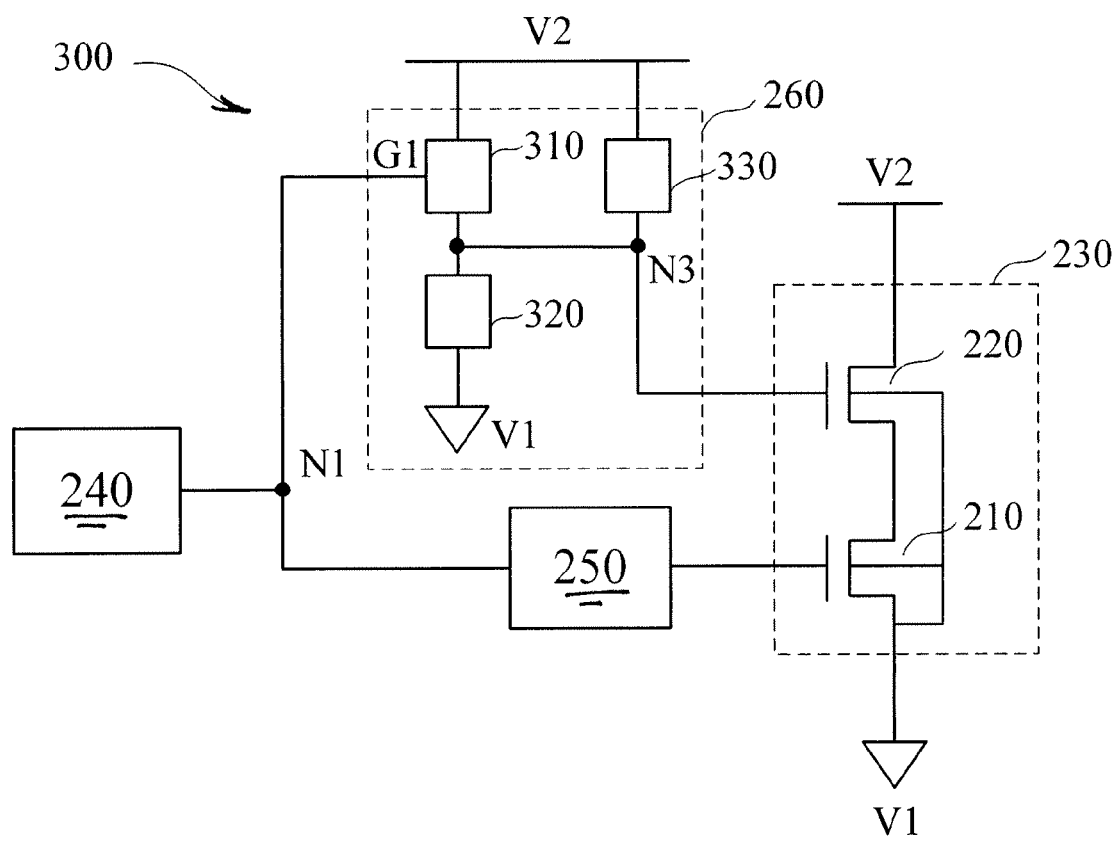
FIG. 3 is a schematic block diagram of an ESD protection circuit according to an embodiment of the present invention.

FIG. 3 is a schematic block diagram of an ESD protection circuit 300 according to an embodiment of the present invention, in which an exemplary structure of the second drive unit 260 is shown.

For the sake of conciseness, contents of FIG. 3 similar to those of FIG. 2 will not be described. In FIG. 3, the second drive unit 260 can comprise a voltage-controlled switch unit 310, a first voltage divider component 320 and a second voltage divider component 330.

The voltage-controlled switch unit 310 is connected between V2 and the gate of the second transistor 220, and its control terminal G1 is connected to the output of the ESD event detection unit 240, such that the ON/OFF state of the voltage-controlled switch unit 310 is controlled based on the signal output from the ESD event detection unit 240. Specifically, the voltage-controlled switch unit 310 is turned on during an ESD event and turned off when there is no ESD event.

A first terminal of the first voltage divider component 320 is connected to the gate of the second transistor 220, and a second terminal thereof is connected to V1. A first terminal of the second voltage divider component 330 is connected to V2 and a second terminal thereof is connected to the gate of the second transistor 220.

The operation of the ESD protection circuit 300 in this embodiment will be described with reference to FIG. 3.

When an ESD event occurs, the first drive unit 250 outputs high voltage such that the first transistor 210 is turned on.

During the process, the voltage-controlled switch unit 310 is turned on such that the second voltage divider component 330 is short-circuited. Now the voltage at node N3 is high such that the second transistor 220 is turned on. Thus, the first transistor 210 and the second transistor 220 which have been turned on, provide an ESD current, thereby enabling protection for the chip.

When the chip is powered on, or during the chip's normal operation, if there is no ESD event, the first drive unit 250 outputs low voltage such that the first transistor 210 is turned off. During the process, the voltage-controlled switch unit 310 is also turned off. The first voltage divider component 320 and the second voltage divider component 330 are connected in series between V1 and V2, constituting a voltage divider to divide the voltage between V1 and V2. Assuming that the first voltage divider component 320 and the second voltage divider component 330 respectively have a first equivalent resistance R1 and a second equivalent resistance R2, the ratio between R1 and R2 can be preferably selected such that a difference between V2 and the voltage at node N3 is smaller than or equal to the safe operating voltage of the second transistor 220, thereby guaranteeing the safety of the second transistor 220 in OFF state. The values of R1 and R2 can be selected as needed, which would affect the voltage at node N3 as well as the current flowing through the first voltage divider component 320 and the second voltage divider component 330. Preferably, the sum of R1 and R2 can be selected such that the current flowing through the first voltage divider component 320 and the second voltage divider component 330 during normal operation of the chip is less than 1 μA, thereby reducing power consumption. For example, if the difference between V2 and V1 is 5 V, when the sum of R1 and R2 is larger than 5 MΩ, the current flowing through the first voltage divider component 320 and the second voltage divider component 330 would be less than 1 μA.

Figure 4:
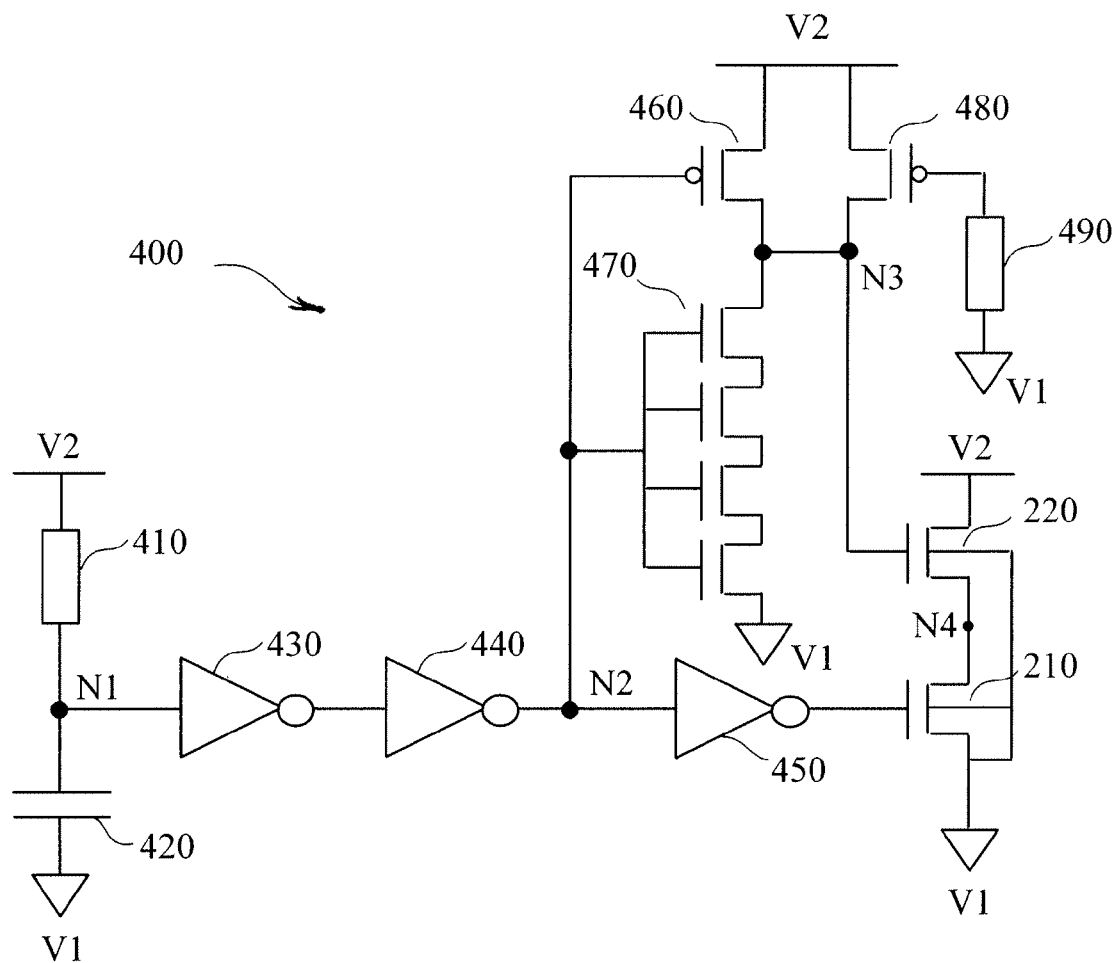
FIG. 4 is a circuit diagram of a specific example of an ESD protection circuit according to an embodiment of the present invention.

FIG. 4 is a circuit diagram of a specific example of an ESD protection circuit 400 according to an embodiment of the present invention.

As shown in FIG. 4, a filter resistor 410 and a filter capacitor 420, which are connected in series, comprise an ESD event detection unit that corresponds to the ESD event detection unit 240 shown in FIGS. 2 and 3. One terminal of the filter resistor 410 and one terminal of the filter capacitor 420 are interconnected as an output N1 of the ESD event detection unit, and the other terminal of the filter resistor 410 and the other terminal of the filter capacitor 420 are respectively connected to the second potential V2 and the first potential V1.

Optionally, the circuit 400 can include inverters 430 and 440 which correspond to the third drive unit described with reference to FIG. 2. The output N1 of the ESD event detection unit is connected to the input of inverter 430, and the output of inverter 430 is in turn connected to the input of inverter 440. It is understood that the structure shown here is merely illustrative but not limiting. Actually, the third drive unit is not limited to the inverter chain, and the number of the inverters is not limited to two, but can be selected depending on the output of the ESD event detection unit. For example, for the configuration shown in FIG. 4, the number of the inverters in the third drive unit can be any even number; however, if the positions of the filter resistor 410 and the filter capacitor 420 are interchanged, the number of inverters in the third drive unit can be any odd number.

The output N2 of inverter 440 is connected to the input of inverter 450 and is also connected to the gate of PMOS transistor 460 and the gates of one or more series-connected NMOS transistors 470. A third transistor 480 is connected between V2 and node N3, the gate of which is optionally connected to V1 via the resistance unit 490 so as to always be in a low potential. Preferably, the resistance unit 490 can be a tie-high NMOS transistor having its gate coupled to high voltage. Herein, inverter 450 corresponds to the first drive unit 250 shown in FIGS. 2 and 3, PMOS transistor 460 corresponds to the voltage-controlled switch unit 310 shown in FIG. 3, one or more NMOS transistors 470 correspond to the first voltage divider component 320 in FIG. 3, and the third transistor 480 together with the optional resistance unit 490 correspond to the second voltage divider component 330 in FIG. 3. Preferably, the channel width-to-length ratio (W/L) of each of NMOS transistors 470 and the third transistor 480 can be selected to be small enough to have a large equivalent resistance, thereby reducing current flowing there through during the normal operation of the chip (e.g. less than 1 μA).

As in FIGS. 2 and 3, the first transistor 210 and the second transistor 220 are connected in series between V1 and V2, wherein V1 is a low potential and V2 is a high potential. The output of inverter 450 is connected to the gate of the first transistor 210 and node N3 is connected to the gate of the second transistor 220.

Next, the operation of the ESD protection circuit is described with reference to FIG. 4. For the convenience of description, it is assumed that $V1=V_{ss}=0$ V, $V2=V_{cc}=5$ V.

When an ESD event occurs, the high-frequency ESD pulse causes the voltage at node N1 to be low. Via inverters 430 and 440, the voltage at node N2 is low, and thus the voltage output from inverter 450 is high. Thus, the first transistor 210 is turned on. Meanwhile, since the voltage at node N2 is low, PMOS transistor 460 is turned on and NMOS transistors 470 are all turned off, such that the voltage at node N3 is high. Thus, the second transistor 220 has enough drive voltage and it is turned on. The switch time of the second transistor 220 can be affected by appropriately selecting the size of PMOS transistor 460. Generally, the size of PMOS transistor 460 can be selected to be comparable with the PMOS transistor in inverter 450. The first transistor 210 and the second transistor 220 that have been turned on can provide enough electrostatic discharge current, thereby enabling protection for the chip.

When the chip is powered on, or during the chip's normal operation, if there is no ESD event, the voltage at node N1 is high. Via inverters 430 and 440, the voltage at node N2 is high, and thus the voltage output from inverter 450 is low. Thus, the first transistor 210 is turned off. Meanwhile, since the voltage of node N2 is high, PMOS transistor 460 is turned off and NMOS transistors 470 are all turned on, such that the third transistor 480 is also turned on since its gate is grounded. The third transistor 480 and NMOS transistors 470 are connected in series between $V_{cc}$ (5 V) and $V_{ss}$ (0 V) for dividing voltage. The channel W/L of the third transistor 480 and each of NMOS transistors 470 can be such selected that the voltage at node N2 is about 3.3 V. At this point, the voltage at node N4 between the first transistor 210 and the second transistor 220 would rise to about 2.5 V, and the first transistor 210 and the second transistor 220 are both turned off and are both in a safe state. The voltage values given in this example are merely illustrative, and in practice, device parameters can be selected as needed so as to obtain desirable results.

Based on the description made with reference to FIGS. 2-4 using two series-connected transistors 210 and 220, both of which have lower safe operating voltages, to replace transistor 110 of FIG. 1, can provide enough ESD current with much smaller area, thereby significantly saving chip area. Further, the drive circuits of the clamp transistors can be suitably designed such that the clamp transistors are always under a safe bias voltage when an ESD event occurs, as well as when there is no ESD event, and are thus capable of operating stably for a long term.

In addition, with reference to the description of FIGS. 2-4, an ESD protection method can be provided. In order to implement this method, as shown in FIG. 2, an electrostatic discharge path is provided by the first transistor 210 and the second transistor 220 connected in series between the first potential V1 and the second potential V2, wherein V1 is lower than V2. As shown in FIG. 2, the first transistor 210 and the second transistor 220 are both NMOS transistors, the source of the first transistor 210 is connected to V1, and the drain of the second transistor 220 is connected to V2. The method can comprise: detecting an ESD event and outputting a corresponding control signal; based on the control signal, turning on the first transistor 210 and the second transistor 220 during an ESD event, and turning off the first transistor 210 and the second transistor 220 when there is no ESD event. Further optional details about this ESD protection method are known from the description of the operation of the ESD protection circuit made above with reference to FIGS. 2-4.

The ESD protection circuit and the corresponding ESD protection method according to the present invention have been described in detail. In order not to obscure the concept of the present invention, some details already known in the art are not described. One of ordinary skill in the art would know how to implement the technical solutions disclosed herein based on the above description.

Although some specific embodiments of the present invention have been demonstrated in detail with examples, it should be a person of ordinary skill in the art would understand that the above examples are only intended to be illustrative but not to limit the scope of the present invention. It should be understood by a person of ordinary skill in the art that the above embodiments can be modified without departing from the scope and spirit of the present invention. The scope of the present invention is defined by the claims.

What is claimed is:

1. An electrostatic discharge (ESD) protection circuit, comprising:
    an electrostatic discharge unit comprising a first transistor and a second transistor that are connected in series between a first potential and a second potential to form an electrostatic discharge path, wherein the first potential is lower than the second potential, the first transistor and the second transistor both are NMOS transistors, a source of the first transistor is connected to the first potential, and a drain of the second transistor is connected to the second potential;
    an ESD event detection unit for detecting an ESD event;
    a first drive unit connected between an output of the ESD event detection unit and a gate of the first transistor, the first drive unit causing the first transistor to be turned on during the ESD event and causing the first transistor to be turned off when there is no ESD event; and
    a second drive unit connected between the output of the ESD event detection unit and a gate of the second transistor, the second drive unit causing the second transistor to be turned on during the ESD event and causing the second transistor to be turned off when there is no ESD event,
    wherein the second drive unit comprises:
        a voltage-controlled switch unit connected between the second potential and the gate of the second transistor, wherein a control terminal of the voltage-controlled switch unit is connected to the output of the ESD event detection unit, and the voltage-controlled switch unit is turned on during the ESD event and is turned off when there is no ESD event;
        a first voltage divider component, a first terminal of which is connected to the gate of the second transistor and a second terminal of which is connected to the first potential; and
        a second voltage divider component, a first terminal of which is connected to the second potential and a second terminal of which is connected to the gate of the second transistor.

2. The ESD protection circuit of claim 1, wherein a safe operating voltage of the first transistor and a safe operating voltage of the second transistor are both smaller than a difference between the second potential and the first potential.

3. The ESD protection circuit of claim 1, wherein when the second transistor is turned off, a difference between the second potential and a gate voltage of the second transistor is smaller than or equal to the safe operating voltage of the second transistor.

4. The ESD protection circuit of claim 1, wherein when there is no ESD event, the first voltage divider component has a first equivalent resistance, the second voltage divider component has a second equivalent resistance, the first equivalent resistance and the second equivalent resistance are selected such that a difference between the second potential and the gate voltage of the second transistor is smaller than or equal to the safe operating voltage of the second transistor when there is no ESD event.

5. The ESD protection circuit of claim 4, wherein a sum of the first equivalent resistance and the second equivalent resistance is larger than 5 MΩ.

6. The ESD protection circuit of claim 1, wherein the first drive unit is a single inverter or an odd number of cascaded inverters.

7. The ESD protection circuit of claim 1, wherein the voltage-controlled switch unit is a PMOS transistor having a gate connected to the output of the ESD event detection unit, a source connected to the second potential and a drain connected to the gate of the second transistor.

8. The ESD protection circuit of claim 1, wherein the first voltage divider component comprises one or more NMOS transistors connected in series, the gate of each being connected to the output of the ESD event detection unit.

9. The ESD protection circuit of claim 1, wherein the second voltage divider component comprises a third transistor, wherein the third transistor is a PMOS transistor having a gate connected to the first potential, a source connected to the second potential and a drain connected to the gate of the second transistor.

10. The ESD protection circuit of claim 9, wherein the second voltage divider component further comprises a first resistance unit that is located between and connected to the gate of the third transistor and the first potential.

11. The ESD protection circuit of claim 10, wherein the first resistance unit is a tie-high NMOS transistor.

12. The ESD protection circuit of claim 1, wherein the ESD event detection unit comprises a filter resistor and a filter capacitor connected in series, one terminal of the filter resistor and one terminal of the filter capacitor being interconnected as the output of the ESD event detection unit, and the other terminal of the filter resistor and the other terminal of the filter capacitor being respectively connected to the second potential and the first potential.

13. The ESD protection circuit of claim 1, further comprising:
    a third drive unit consisting of at least one inverter, wherein an input of the third drive unit is connected to the output of the ESD event detection unit, and an output of the third drive unit is connected to an input of the first drive unit and an input of the second drive unit.

14. An electrostatic discharge (ESD) protection method, wherein an electrostatic discharge path is formed by a first transistor and a second transistor that are connected in series between a first potential and a second potential, the first potential being lower than the second potential, the first transistor and the second transistor both being NMOS transistors, a source of the first transistor being connected to the first potential, a drain of the second transistor being connected to the second potential, said method comprising:
- detecting an ESD event and outputting a corresponding control signal; and
- based on said control signal, causing the first transistor and the second transistor to be turned on during the ESD event, and causing the first transistor and the second transistor to be turned off when there is no ESD event,
- wherein controlling the gate voltage of the second transistor when there is no ESD event comprises:
  - providing a first voltage divider component and a second voltage divider component, wherein a first terminal of the first voltage divider component is connected to the gate of the second transistor, a second terminal of the first voltage divider component is connected to the first potential, a first terminal of the second voltage divider component is connected to the second potential and a second terminal of the second voltage divider component is connected to the gate of the second transistor; and
  - selecting such equivalent resistances of the first voltage divider component and the second voltage divider component when there is no ESD event that a difference between the second potential and the gate voltage of the second transistor is smaller than or equal to the safe operating voltage of the second transistor when there is no ESD event.

15. The ESD protection method of claim 14, wherein a safe operating voltage of the first transistor and a safe operating voltage of the second transistor are both smaller than a difference between the second potential and the first potential.

16. The ESD protection method of claim 14, wherein the first transistor and the second transistor are separately controlled by different drive circuits.

17. The ESD protection method of claim 14, wherein a voltage-controlled switch unit connected between the second potential and the gate of the second transistor is used for controlling the ON and OFF state of the second transistor.

18. The ESD protection method of claim 14, further comprising:
- when there is no ESD event, controlling a gate voltage of the second transistor such that a difference between the second potential and the gate voltage of the second transistor is smaller than or equal to a safe operating voltage of the second transistor.

19. The ESD protection method of claim 14, wherein the sum of the equivalent resistances of the first voltage divider component and the second voltage divider component is larger than 5 MΩ.

20. The ESD protection method of claim 14, wherein detecting the ESD event and outputting the control signal comprises:
- providing a filter resistor and a filter capacitor connected in series, wherein one terminal of the filter resistor and one terminal of the filter capacitor are interconnected as a common terminal, and the other terminal of the filter resistor and the other terminal of the filter capacitor are respectively connected to the second potential and the first potential; and
- setting a voltage at the common terminal as the control signal.

* * * * *